No. 882,495. PATENTED MAR. 17, 1908.
G. R. DUNN.
TROLLEY CAR POLE ATTACHMENT.
APPLICATION FILED AUG. 30, 1906.
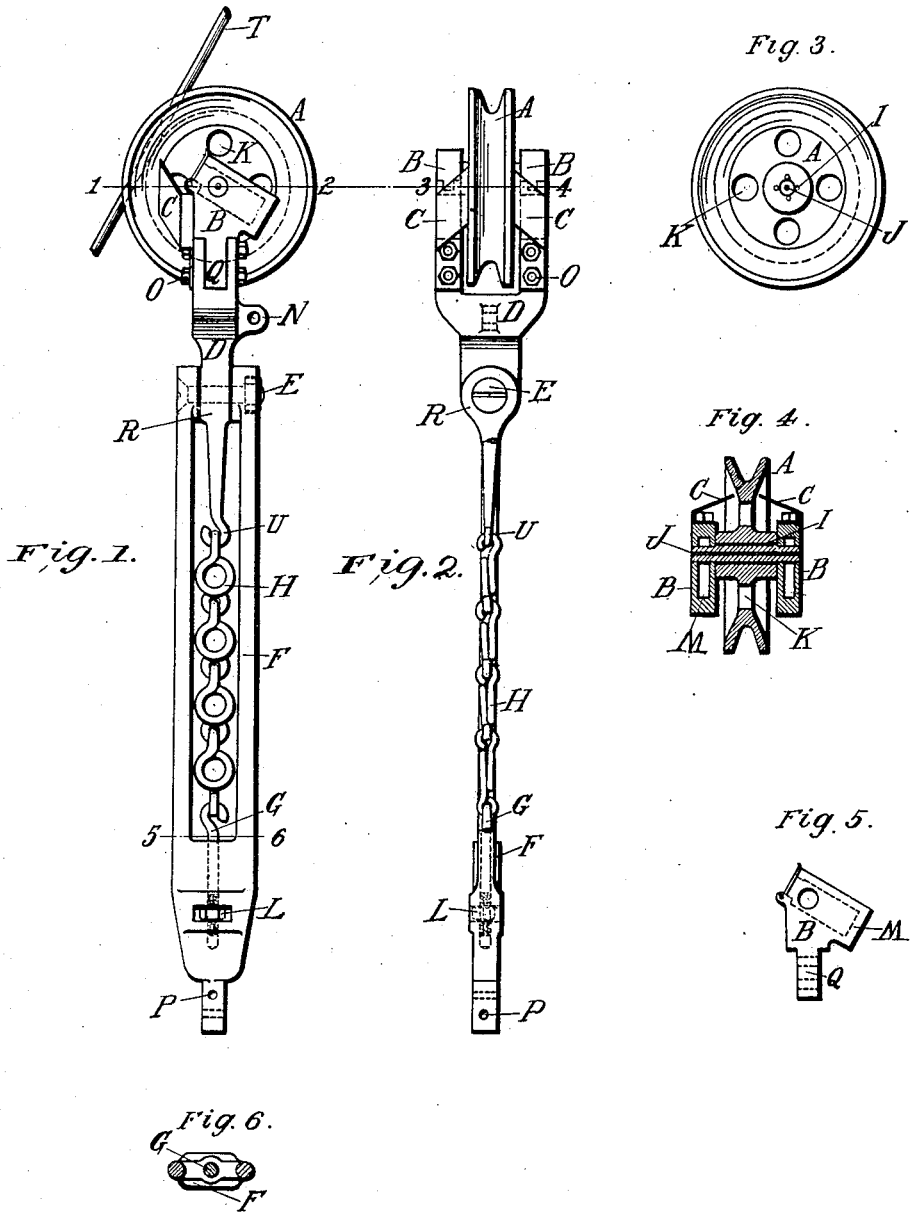
Inventor
George R. Dunn
per
J. Clyde Hizar,
Attorney
Witnesses

UNITED STATES PATENT OFFICE.

GEORGE R. DUNN, OF SAN DIEGO, CALIFORNIA, ASSIGNOR OF ONE-HALF TO SOLAN BRYAN, OF SAN DIEGO, CALIFORNIA.

TROLLEY-CAR-POLE ATTACHMENT.

No. 882,495.  Specification of Letters Patent.  Patented March 17, 1908.

Application filed August 30, 1906. Serial No. 332,615.

*To all whom it may concern:*

Be it known that I, GEORGE R. DUNN, of San Diego, county of San Diego, and State of California, have invented certain new and useful Improvements in Trolley-Car-Pole Attachments; and I do hereby declare the following to be a full and clear description thereof.

My invention relates to trolleys for overhead wires, and particularly to wheel attachments of the trolleys carried by poles ordinarily used on cars driven by electric motors. It is requisite for the best results in actual use that the wheel which runs in contact with the line wire overhead shall be held rigidly or unyieldingly as to vibration in the direction it travels, while it is still more important that it shall be allowed freedom of vibration laterally, or sidewise, so as to follow the wire closely when passing around curves. It is further important that the spring attachment employed for holding the wheel in due position while permitting lateral movement shall be at once strong yet sensitive, also durable, and so arranged as to be well protected from contact with other objects, thus avoiding injury or breakage as well as entanglement and friction. The entire attachment should likewise combine minimum weight and size, for obvious reasons.

The details of construction, arrangement, and operation of my invention are as hereinafter described, and illustrated in the accompanying drawings, in which Figure 1 is a side view of the attachment complete. Fig. 2 is an edge view of the same. Fig. 3 is a face view of the trolley wheel detached. Fig. 4 is a cross section on the lines 1—2 and 3—4 of Figs. 1 and 2, respectively. Fig. 5 is a side view of the oil-box and journal bearing. Fig. 6 is a cross section on the line 5—6 of Fig. 1.

In Fig. 1, F indicates a bifurcated frame constituting the holder for the "harp", or forked hanger, D, in which the trolley wheel A is journaled. The said frame F is provided at its lower end with a tenon having a transverse hole P, to receive a pin, or bolt, for fastening it to the trolley pole proper (not shown). The "harp," or hanger, D, is pivoted upon a bolt E, passing transversely through the upper end of the forks of frame F. The head of said bolt is counter-sunk, and the nut screwed upon its opposite end is also countersunk for the purpose of preventing the line wire T from catching should the attachment be thrown off the wire. The "harp" or hanger D has an elongated downwardly extending shank R, whose lower end is formed as a hook and connected with a spring chain H. The lower end of said chain is in turn connected with the hook of a screw bolt G, that passes through the bore in the solid lower end of the forked frame F, the latter having a transverse slot that receives a nut L applied to said bolt. It is obvious that by turning the nut on the bolt G, the tension of the spring chain H may be varied as required. The chain is made up of a series of spring links each of which is formed of a spring wire that is coiled upon itself, as shown in Figs. 1 and 2, and each terminal thereof formed as a hook, the several hooks being engaged throughout the series as will be readily understood. Thus each link forms an elastic element or part of the chain as a whole. Experience has demonstrated that by constructing the chain in this manner, an important advantage is obtained, since the chain combines maximum strength and sensitiveness, so that it will hold the trolley wheel in the proper position, and yet readily allow the wheel to yield laterally as when the trolley is passing around the curve, or when there is a sudden jar or unusual vibration caused by the motion of the car. In other words, it has been demonstrated that with a spring chain attachment thus applied, the trolley wheel will yield readily to curves or sinuosities of the wire T, so that a good electrical connection is at all times preserved, and without danger of the wheel being thrown from the wire as is so often the case with the ordinary trolley. It will be further seen, that the chain H is in the same plane with the side bars of the forked frame F, and is thus practically inclosed and consequently protected by them, so that it is not liable to come in contact with other objects and hence not liable to be injured or broken in use.

It will be seen that the wheel A is not adapted to, and cannot, swing in the direction of its travel, save as it moves with the forked frame, F, and the trolley pole to which said frame is in practice attached; but, since the pivoted bolt E is arranged in a plane at right angles to the axis of the wheel A, the latter is adapted to swing laterally or sidewise, and may thus follow the curves or sinuosities of the wire T.

The wheel proper A is mounted upon an axle having a central longitudinal hole J—see Figs. 3 and 4—which permits circulation of air for cooling the axle. Oil is contained in chambers M of boxes B, each of which is provided with a shank Q—see Figs. 1 and 5—the shanks being fitted in open slots in the forks of the harp E, and secured therein by bolts O. Holes I—see Figs. 3 and 4—are drilled in web of wheel A, close to axle, to allow passage of oil from one pocket M to the other. The harp has a perforated lug N—see Fig. 1—for attachment of a rope as usual in this class of devices. To each of the oil boxes B is attached a shield or fender C—see Figs. 1 and 4. These are constructed of sheet metal, and secured by bolts, their free ends being bent inward or inclined toward the rim of the wheel A. They serve to prevent the line wire T from catching on the attachment on either side of the wheel A. the latter has a series of holes K in its body or web, whereby its weight is reduced without materially reducing its strength.

What I claim is—

The improved trolley-pole attachment comprising the bifurcated frame F, the harp journaled therein and adapted to swing laterally, the trolley wheel arranged in the harp in a plane parallel to said frame, and a spring chain connecting the shank of the harp with the frame and arranged between the forks of the same, as described.

In testimony whereof I have affixed my signature in the presence of two witnesses.

GEORGE R. DUNN.

Witnesses:
　HENRY E. MILLS,
　HENRY E. MILLS, Jr.